United States Patent
Xiang

(10) Patent No.: US 12,388,464 B2
(45) Date of Patent: Aug. 12, 2025

(54) METHOD FOR COMPRESSING AND ENCRYPTING HAPTIC EFFECT DATA, SYSTEM, AND RELATED DEVICES

(71) Applicant: AAC Acoustic Technologies (Shanghai) Co., Ltd., Shanghai (CN)

(72) Inventor: Zheng Xiang, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 184 days.

(21) Appl. No.: 18/342,689

(22) Filed: Jun. 27, 2023

(65) Prior Publication Data

US 2024/0194038 A1 Jun. 13, 2024

Related U.S. Application Data

(63) Continuation of application No. PCT/CN2022/144322, filed on Dec. 30, 2022.

(30) Foreign Application Priority Data

Dec. 8, 2022 (CN) .......................... 202211574168.4

(51) Int. Cl.
G08B 6/00 (2006.01)
H03M 7/30 (2006.01)
H04L 9/08 (2006.01)

(52) U.S. Cl.
CPC ................ *H03M 7/60* (2013.01); *G08B 6/00* (2013.01); *H04L 9/088* (2013.01)

(58) Field of Classification Search
CPC ............. H03M 7/60; G08B 6/00; H04L 9/088
USPC .......................................................... 713/171
See application file for complete search history.

(56) References Cited

U.S. PATENT DOCUMENTS

| | | | | |
|---|---|---|---|---|
| 2010/0262673 | A1* | 10/2010 | Chang | H04L 67/141 715/764 |
| 2014/0347177 | A1* | 11/2014 | Phan | A63F 13/285 340/407.1 |
| 2024/0373081 | A1* | 11/2024 | Sodagar | H04N 21/435 |
| 2024/0402813 | A1* | 12/2024 | Vezzoli | G06F 3/016 |

\* cited by examiner

*Primary Examiner* — Dereena T Cattungal
(74) *Attorney, Agent, or Firm* — Wiersch Law Group

(57) ABSTRACT

A method for compressing and encrypting haptic effect data, a system, and related devices are provided. Compared with related technologies, in the method for compressing and encrypting the haptic effect data of the disclosure, the encryption and compression manners are respectively adopted for processing from the data obtaining stage to the playing stage, so that the storage space of the haptic effect data is saved when the data is stored, and the original data can be restored when the data is played, thus ensuring the playing effect. In addition, the encryption algorithm is used for data encryption during storage, which can ensure the security of the original haptic effect data during storage.

4 Claims, 3 Drawing Sheets

METHOD FOR COMPRESSING AND ENCRYPTING HAPTIC EFFECT DATA, SYSTEM, AND RELATED DEVICES

CROSS REFERENCE TO RELATED APPLICATIONS

The present application is a continuation of PCT Patent Application No. PCT/CN2022/144322, filed Dec. 30, 2022, which claims priority to Chinese patent application No. 202211574168.4, filed Dec. 8, 2022, each of which is incorporated by reference herein in its entirety.

TECHNICAL FIELD

The various embodiments described in this document relate in general to a method for processing haptic effect data, and more specifically to a method for compressing and encrypting haptic effect data, a system, and related devices.

BACKGROUND

With the development of consumer electronic technology, haptic feedback schemes based on brakes such as vibration motors and voice coil motors have been widely used in various consumer electronic products such as mobile phones and tablets.

In related technologies, all kinds of haptic effect data are stored in the digital end of haptic feedback scheme in the form of digital signals. When haptic effects are needed, the system invokes the digital signals and converts them into analog signals through some digital-to-analog conversion equipment, thus driving brakes to apply haptic feedback effects. There are two manners to generate haptic effect data.

The first manner is usually called a RAM mode. Designed effect data is prestored in a memory, such as a hard disk in the PC or a RAM unit in the chip, which can be invoked directly through an interface when needed.

The second manner is usually called a RTP mode. Required haptic effect data is generated in real time through a signal processing link at the digital end.

However, either RAM mode or RTP mode, there are two unavoidable problems in the process of storing and generating haptic effect data, and with the rapid development of haptic feedback technology, these two problems become more and more prominent.

The first problem is that a storage space occupied by haptic effect data may become larger and larger with the increase of preset effect files.

The second problem is that there is a data security problem because the original haptic effect data is stored in a disk or RAM space that can be accessed by users.

Therefore, it is necessary to provide a method for processing haptic effect data to solve the above problems.

SUMMARY

Embodiments of the disclosure aim to provide a method for processing haptic effect data, which can reduce the storage size and encryption requirement of haptic effect data.

In order to solve the above technical problems, in a first aspect, embodiments of the disclosure provide a method for compressing and encrypting haptic effect data, including: obtaining haptic effect data; compressing the haptic effect data according to a preset compression manner and encrypting haptic effect data subjected to compressing according to a preset encryption manner to obtain haptic storage data, wherein the preset compression manner is to perform down-sampling on the haptic effect data according to a preset compression frequency; decrypting the haptic storage data according to a preset decryption manner and decompressing haptic storage data subjected to decrypting according to a preset decompression manner to obtain haptic feedback data, wherein the preset decompression manner is to perform up-sampling on the haptic storage data according to a preset playback frequency; and performing digital-analog (DA) conversion on the haptic feedback data, and inputting data subjected to DA conversion into a braking unit for playing of haptic effect.

In a first aspect, embodiments of the disclosure provide a method for compressing and encrypting haptic effect data, including: obtaining haptic effect data; compressing the haptic effect data according to a preset compression manner and encrypting haptic effect data subjected to compressing according to a preset encryption manner to obtain haptic storage data, wherein the preset compression manner is to compress the haptic effect data whose frequency is an original frequency according to source coding; decrypting the haptic storage data according to a preset decryption manner and decompressing haptic storage data subjected to decrypting according to a preset decompression manner to obtain haptic feedback data, wherein the preset decompression manner is to restore the haptic storage data to the original frequency; and performing digital-analog (DA) conversion on the haptic feedback data, and inputting data subjected to DA conversion into a braking unit for playing of haptic effect.

In some embodiments, the preset encryption manner is to encrypt the haptic effect data subjected to compressing through a preset key; and the preset decryption manner is to decrypt the haptic storage data through the preset key.

In a third aspect, embodiments of the disclosure provide a compression and encryption system for haptic effect data, including a data obtaining module configured to obtain haptic effect data; a compression and encryption module configured to compress the haptic effect data according to a preset compression manner, and to encrypt haptic effect data subjected to compressing according to a preset encryption manner to obtain haptic storage data, wherein the preset compression manner is to perform down-sampling on the haptic effect data according to a preset compression frequency; a decompression and decryption module configured to decrypt the haptic storage data according to a preset decryption manner, and decompressing the haptic storage data subjected to decrypting according to a preset decompression manner to obtain haptic feedback data, wherein the preset decompression manner is to perform up-sampling on the haptic storage data according to a preset playback frequency; and a haptic effect playback module configured to perform DA conversion on the haptic feedback data and input data subjected to DA conversion into a braking unit for playing of haptic effect.

In a fourth aspect, embodiments of the disclosure provide a compression and encryption system for haptic effect data, including: a data obtaining module configured to obtain haptic effect data; a compression and encryption module configured to compress the haptic effect data according to a preset compression manner, and to encrypt haptic effect data subjected to compressing according to a preset encryption manner to obtain haptic storage data, wherein the preset compression manner is to compress the haptic effect data whose frequency is an original frequency according to source coding; a decompression and decryption module configured to decrypt the haptic storage data according to a preset decryption manner, and decompressing the haptic storage data subjected to decrypting according to a preset decompression manner to obtain haptic feedback data, wherein the preset decompression manner is to restore the haptic storage data to the original frequency; and a haptic effect playback module configured to perform DA conversion on the haptic feedback data and input data subjected to DA conversion into a braking unit for playing of haptic effect.

In a fifth aspect, embodiments of the disclosure provide a computer device, including a memory; and a processor, wherein the memory is used for storing a computer program and the computer program is executable on the processor, and the computer program, when executed by the processor, cause the processor to execute the method described in any foregoing aspect above.

In a sixth aspect, embodiments of the disclosure provide a non-transitory computer-readable storage medium storing a computer program, wherein the computer program, when executed by the processor, cause the processor to execute the method described in any foregoing aspect above.

Compared with related technologies, in the method for compressing and encrypting the haptic effect data of the disclosure, the encryption and compression manners are respectively adopted for processing from the data obtaining stage to the playing stage, so that the storage space of the haptic effect data is saved when the data is stored, and the original data can be restored when the data is played, thus ensuring the playing effect. In addition, the encryption algorithm is used for data encryption during storage, which can ensure the security of the original haptic effect data during storage.

BRIEF DESCRIPTION OF THE DRAWINGS

In order to more clearly explain that embodiments of the disclosure, the drawings required for use in the embodiments will be briefly described below, and it will be apparent that the drawings described below are only some of the embodiments of the disclosure, from which other drawings may be obtained without creative effort by a person of ordinary skill in the art.

DETAILED DESCRIPTION OF THE EMBODIMENTS

Technical aspects of the embodiments of the disclosure will be clearly and completely described below in conjunction with the accompanying drawings in the embodiments of the disclosure, and it will be apparent that the described embodiments are part of the embodiments of the disclosure, but not all embodiments of the present disclosure. Based on the embodiments in the present disclosure, all other embodiments obtained by those of ordinary skill in the art without making creative efforts are within the scope of protection of the present disclosure.

Embodiment 1

Figure 1:
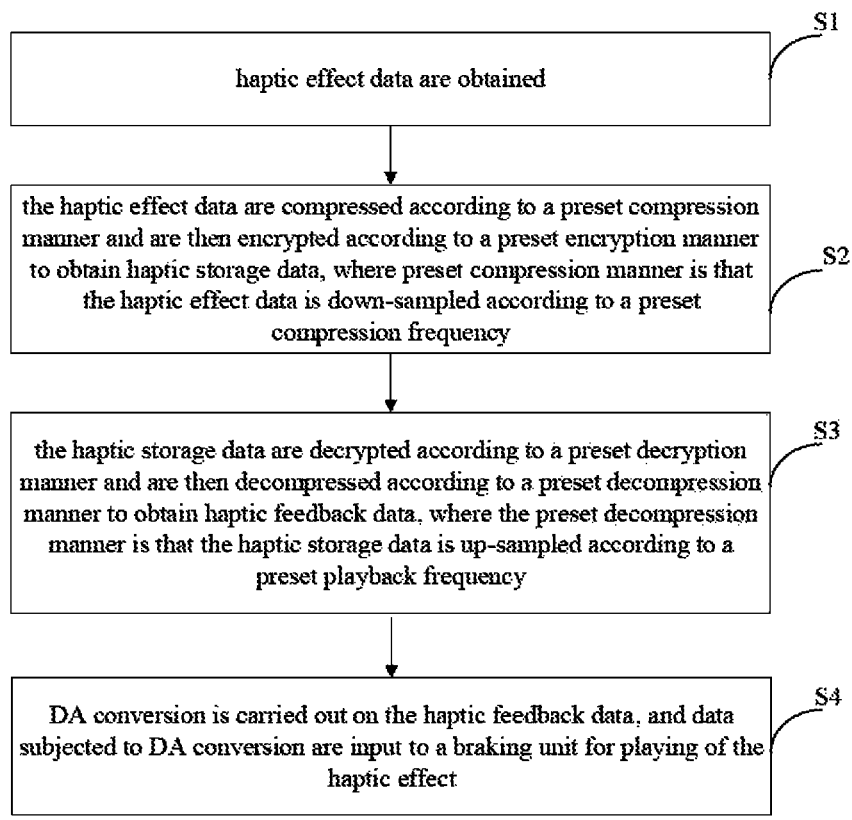
FIG. 1 is a flow chart of a method for compressing and encrypting haptic effect data according to embodiments of the disclosure.

FIG. 1 is a flow chart of a method for compressing and encrypting haptic effect data according to embodiments of the disclosure. As illustrated in FIG. 1, the method includes the following.

At S1, haptic effect data are obtained.

In one example, the haptic effect data in embodiments of the disclosure can be obtained by collecting environment through an audio recording device or by performing haptic effect data editing on a computer software. There is no restriction on the manner of obtaining of the haptic effect data.

At S2, the haptic effect data are compressed according to a preset compression manner and are then encrypted according to a preset encryption manner to obtain haptic storage data, where preset compression manner is that the haptic effect data is down-sampled according to a preset compression frequency.

At S3, the haptic storage data are decrypted according to a preset decryption manner and are then decompressed according to a preset decompression manner to obtain the haptic feedback data, where the preset decompression manner is that the haptic storage data is up-sampled according to a preset playback frequency.

Specifically, the preset compression frequency and the preset playback frequency are changed based on a rate of data. For example, in some embodiments, since a frequency range of human haptic feedback is within 500 Hz, and a frequency range of most haptic feedback data does not exceed 500 Hz, in order to improve the feedback quality of haptic effect while playing haptic effect, it is usually required that no additional noise will be generated. Because human ears are sensitive to noise around 5 kHz to 8 kHz, during playing of the haptic feedback data, a playback rate is generally increased to 24 kHz to 96 kHz. In embodiments of the disclosure, in order to compress a storage space of haptic effect data, a low-rate digital signal such as 4 kHz is used in operations at S2, and a high-rate digital signal such as 48 kHz is used in operations at S3.

In one example, the preset encryption manner is that the haptic effect data subjected to compressing are encrypted through a preset key.

The preset decryption manner is that the haptic storage data are decrypted through the preset key.

Specifically, for the pre-stored or generated haptic feedback data, the haptic feedback data needs to be encrypted in a certain way based on the security requirements. In actual implementations of the embodiments of the disclosure, various existing encryption algorithms can be adopted to achieve a balance between encryption complexity and security. Preferably, when execution subjects of operations at S1 and S2 are inconsistent with those of operations at S3 and S4, the preset key needs to be synchronized from an encryption end to a decryption end, so that a decryption operation can be completed before the haptic feedback signal is decompressed and played.

At S4, digital-analog (DA) conversion is carried out on the haptic feedback data, and data subjected to DA conversion are input to a braking unit for playing of the haptic effect.

Compared with related technologies, in the method for compressing and encrypting the haptic effect data of the disclosure, the encryption and compression manners are respectively adopted for processing from the data obtaining stage to the playing stage, so that the storage space of the haptic effect data is saved when the data is stored, and the original data can be restored when the data is played, thus ensuring the playing effect. In addition, the encryption algorithm is used for data encryption during storage, which can ensure the security of the original haptic effect data during storage.

Embodiment 2

Figure 2:
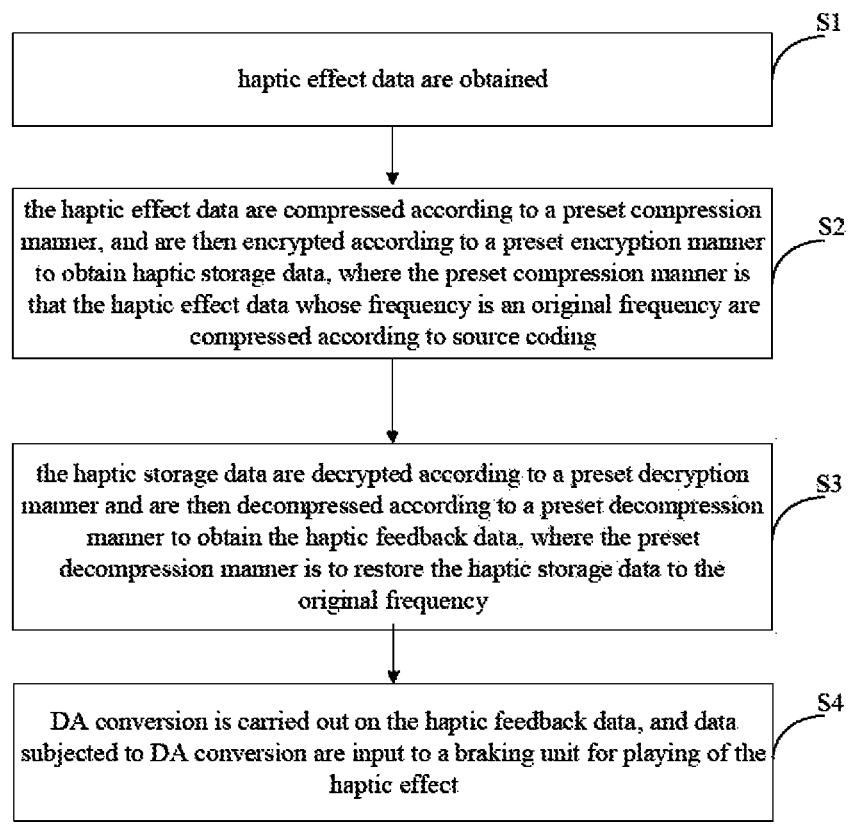
FIG. 2 is a flow chart of a method for compressing and encrypting haptic effect data according to other embodiments of the disclosure.

FIG. 2 is a flow chart of a method for compressing and encrypting haptic effect data according to other embodiments of the disclosure. Referring to FIG. 2, the method begins at S1.

At S1, haptic effect data are obtained.

At S2, the haptic effect data are compressed according to a preset compression manner, and are then encrypted according to a preset encryption manner to obtain haptic storage data, where the preset compression manner is that the haptic effect data whose frequency is an original frequency are compressed according to source coding.

At S3, the haptic storage data are decrypted according to a preset decryption manner and are then decompressed according to a preset decompression manner to obtain the haptic feedback data, where the preset decompression manner is to restore the haptic storage data to the original frequency.

In the embodiment of the disclosure, the compression manner based on the source coding is based on the sporadic and low frequency characteristics of data, and there is generally many redundant information in data. In embodiments of the disclosure, a redundant frequency in the haptic effect data is encoded and compressed according to the source coding in operations at S2, and a compressed part of the data is restored by using the source coding in operations at S3, so that the haptic feedback data with the original frequency are obtained to ensure the quality of haptic feedback.

S4, DA conversion is carried out on the haptic feedback data, and data subjected to DA conversion are input to a braking unit for playing of the haptic effect.

Embodiment 3

Figure 3:
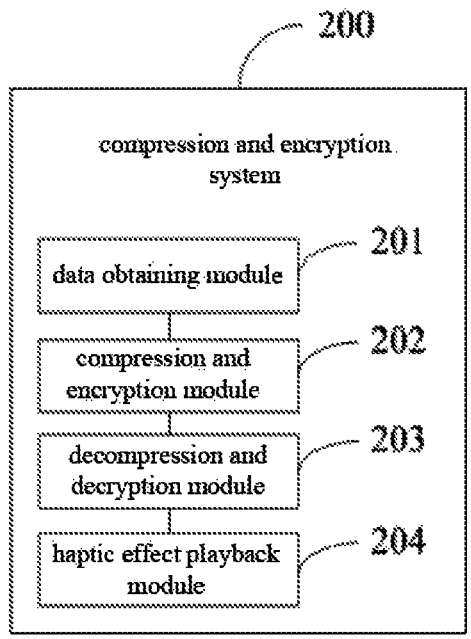
FIG. 3 is a schematic structural diagram of a compression and encryption system for haptic effect data according to embodiments of the disclosure.

Embodiment of the disclosure also provide a compression and encryption system for the haptic effect data. FIG. 3 is a schematic structural diagram of a compression and encryption system for haptic effect data according to embodiments of the disclosure. As illustrated in FIG. 3, the compression and encryption system 200 for the haptic effect data includes a data obtaining module 201, a compression and encryption module 202, a decompression and decryption module 203, and a haptic effect playback module 204.

The data obtaining module 201 is configured to obtain haptic effect data.

The compression and encryption module 202 is configured to compress the haptic effect data according to a preset compression manner, and then to encrypt haptic effect data subjected to compressing according to a preset encryption manner to obtain haptic storage data. The preset compression manner is that the haptic effect data are down-sampled according to a preset compression frequency.

The decompression and decryption module 203 is configured to decrypt the haptic storage data according to a preset decryption manner, and decompressing the haptic storage data subjected to decrypting according to a preset decompression manner to obtain haptic feedback data. The preset decompression manner is: up-sampling the haptic storage data according to a preset playing frequency.

The haptic effect playback module 204 is configured to perform DA conversion on the haptic feedback data and input data subjected to DA conversion into a braking unit for playing of haptic effect.

Embodiment 4

In another possible embodiment, a compression manner used by the compression and encryption module 202 may be different from a compression manner used by the decompression and decryption module 203.

The compression and encryption module 202 is configured to compress the haptic effect data according to a preset compression manner, and then encrypt the haptic effect data subjected to compressing according to a preset encryption manner to obtain haptic storage data. The preset compression manner is to compress the haptic effect data with an original frequency according to a source coding.

The decompression and decryption module 203 is configured to decrypt the haptic storage data according to a preset decryption manner and to decompress the haptic storage data subjected to decrypting according to a preset decompression manner to obtain haptic feedback data. The preset decompression manner is to restore the haptic storage data to the original frequency.

The compression and encryption system 200 for the haptic effect data can perform the steps in the method for compressing and encrypting the haptic effect data as in the above-mentioned embodiments, and can realize the same technical effect. For certain contents, reference may be made to the above-mentioned embodiments, which are not repeated herein.

Embodiment 5

Figure 4:
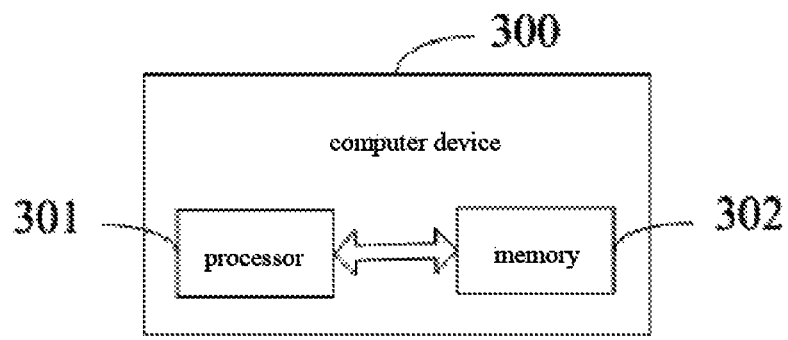
FIG. 4 is a schematic structural diagram of a computer device according to embodiments of the disclosure.

Embodiments of the disclosure also provide a computer device. FIG. 4 is a schematic structural diagram of a computer device according to embodiments of the disclosure. As illustrated in FIG. 4, a computer device 300 includes a memory 302 and a processor 301. The memory 302 is used for storing a computer program and the computer program is executable on the processor 301.

The processor 301 is configured to invoke the computer program stored in the memory 302 to execute the method for compressing and encrypting the haptic effect data provided in embodiments of the present disclosure. Referring to FIG. 1 and FIG. 2, the processor 301 is specifically configured to perform the following.

At S1, haptic effect data are obtained.

At S2, the haptic effect data are compressed according to a preset compression manner, and are then encrypted according to a preset encryption manner to obtain haptic storage data. The preset compression manner is that the haptic effect data is down-sampled according to a preset compression frequency.

At S3, the haptic storage data are decrypted according to a preset decryption manner and are then decompressed according to a preset decompression manner to obtain haptic feedback data, where the preset decompression manner is that the haptic storage data is up-sampled according to a preset playing frequency.

Preferably, the preset encryption manner is that the haptic effect data is encrypted through a preset key.

The preset decryption manner is that the haptic storage data is decrypted through the preset key.

At S4, DA conversion is carried out on the haptic feedback data, and data subjected to DA conversion are input to a braking unit for playing of the haptic effect.

Alternatively, the processor 301 is specifically configured to perform the following.

At S1, haptic effect data are obtained.

At S2, the haptic effect data are compressed according to a preset compression manner, and are then encrypted according to a preset encryption manner to obtain haptic storage data. The preset compression manner is that the haptic effect data whose frequency is an original frequency are compressed according to source coding.

S3, the haptic storage data are decrypted according to a preset decryption manner and are then decompressed according to a preset decompression manner to obtain haptic feedback data, where the preset decompression manner is to restore the haptic storage data to the original frequency.

S4, DA conversion is carried out on the haptic feedback data, and data subjected to DA conversion are input to a braking unit for playing of the haptic effect.

The computer device 300 provided in the embodiments of the present disclosure can perform the method for compressing and encrypting haptic effect data as in the above-mentioned embodiment, and can realize the same technical effect. For certain contents, reference may be made to the above-mentioned embodiments, which are not repeated herein.

Embodiment 6

Embodiments of the disclosure further provide a non-transitory computer-readable storage medium, on which a computer program is stored. The computer program, when executed by the processor, cause the processor to perform each process and step in the method for compressing and encrypting haptic effect data provided in the embodiments of the disclosure, and achieve same technical effect.

The foregoing embodiments are merely some embodiments of the disclosure and are not intended to limit the present disclosure. Any modifications, equivalents, modifications, or the like made within the spirit and principles of the present disclosure should be included within the scope of protection of the present disclosure.

What is claimed is:

1. A method for compressing and encrypting haptic effect data, comprising:

obtaining haptic effect data with an original frequency;

compressing the haptic effect data according to a preset compression manner and encrypting haptic effect data subjected to compressing according to a preset encryption manner to obtain haptic storage data with a preset compression frequency, wherein the preset compression manner is to perform down-sampling on the haptic effect data according to the preset compression frequency;

decrypting the haptic storage data according to a preset decryption manner and decompressing haptic storage data subjected to decrypting according to a preset decompression manner to obtain haptic feedback data with a preset playback frequency, wherein the preset decompression manner is to perform up-sampling on the haptic storage data according to the preset playback frequency; and performing digital-analog (DA) conversion on the haptic feedback data, and inputting data subjected to DA conversion into a braking unit for playing of haptic effect.

2. The method of claim 1, wherein the preset encryption manner is to encrypt the haptic effect data subjected to compressing through a preset key; and the preset decryption manner is to decrypt the haptic storage data through the preset key.

3. A method for compressing and encrypting haptic effect data, comprising:

obtaining haptic effect data with an original frequency;

compressing the haptic effect data according to a preset compression manner and encrypting haptic effect data subjected to compressing according to a preset encryption manner to obtain haptic storage data, wherein the preset compression manner is to compress the haptic effect data according to source coding;

decrypting the haptic storage data according to a preset decryption manner and decompressing haptic storage data subjected to decrypting according to a preset decompression manner to obtain haptic feedback data with a frequency equal to the original frequency, wherein the preset decompression manner is to restore the frequency of the haptic storage data to the original frequency; and performing digital-analog (DA) conversion on the haptic feedback data, and inputting data subjected to DA conversion into a braking unit for playing of haptic effect.

4. The method of claim 3, wherein the preset encryption manner is to encrypt the haptic effect data subjected to compressing through a preset key; and the preset decryption manner is to decrypt the haptic storage data through the preset key.

* * * * *